United States Patent [19]

Kiser et al.

[11] Patent Number: 4,811,089
[45] Date of Patent: Mar. 7, 1989

[54] HIGH RESOLUTION FULL COLOR EXPOSURE DEVICE USING AN ELECTRONICALLY GENERATED MASK

[75] Inventors: T. Kay Kiser, Kettering; Erik K. Nelson, Centerville; Edward J. Saccocio, Columbus, all of Ohio

[73] Assignee: The Mead Corporation, Dayton, Ohio

[21] Appl. No.: 41,802

[22] Filed: Apr. 23, 1987

[51] Int. Cl.$^4$ .............................................. H04N 1/46
[52] U.S. Cl. ........................................ 358/75; 358/80
[58] Field of Search ............................. 358/75, 80, 76

[56] References Cited

U.S. PATENT DOCUMENTS

| | | | |
|---|---|---|---|
| 2,956,875 | 10/1960 | Ulary | 96/1 |
| 3,004,860 | 10/1961 | Gundlach | 117/17.5 |
| 3,123,666 | 3/1964 | Bailey | 358/76 |
| 3,192,136 | 6/1965 | Reid | 204/11 |
| 3,604,326 | 9/1971 | James, II | 95/4.5 |
| 3,775,115 | 11/1973 | Sorkin et al. | 96/33 |
| 3,810,758 | 5/1974 | Tulagin et al. | 96/1.2 |
| 3,914,788 | 10/1975 | Niehaus | 358/75 |
| 4,003,312 | 1/1977 | Gunther | 101/466 |
| 4,155,735 | 5/1979 | Ernsberger | 65/30 |
| 4,285,988 | 8/1981 | Ernsberger | 427/12 |
| 4,321,317 | 3/1982 | MacIver | 430/5 |
| 4,393,398 | 7/1983 | Horiguchi et al. | 358/80 X |
| 4,429,027 | 1/1984 | Chambers, Jr. et al. | 430/5 |
| 4,430,668 | 2/1984 | Miles, Jr. | 358/80 X |
| 4,436,797 | 3/1984 | Brady et al. | 430/5 |
| 4,448,865 | 5/1984 | Bohlen et al. | 430/5 |
| 4,463,373 | 7/1984 | Mikami | 358/80 X |
| 4,553,835 | 11/1985 | Morgan, Jr. | 358/325 X |
| 4,561,016 | 12/1985 | Jung et al. | 358/80 X |
| 4,685,000 | 8/1987 | Barrett | 358/76 X |
| 4,748,475 | 5/1988 | Ishiyama et al. | 355/27 |
| 4,772,922 | 9/1988 | Kawahara et al. | 355/32 |

FOREIGN PATENT DOCUMENTS 0209105 1/1987 European Pat. Off. ............. 358/76

Primary Examiner—James J. Groody
Assistant Examiner—E. Anne Faris
Attorney, Agent, or Firm—Smith & Schnacke

[57] ABSTRACT

The present invention relates to a high resolution full color exposure device using electronically generated masks, from computer output, for color separations which yield full color hard-copy. A blue color separation is electronically generated and a photosensitive material is exposed to a first wavelength through the blue color separation. A green color separation is then electronically generated and the same photosensitive material is exposed to a second wavelength through the green separation. A red color separation is electronically generated and the same photosensitive material is exposed to a third wavelength through the red color separation. Upon development of the photosensitive material, a full color image is formed.

12 Claims, 4 Drawing Sheets

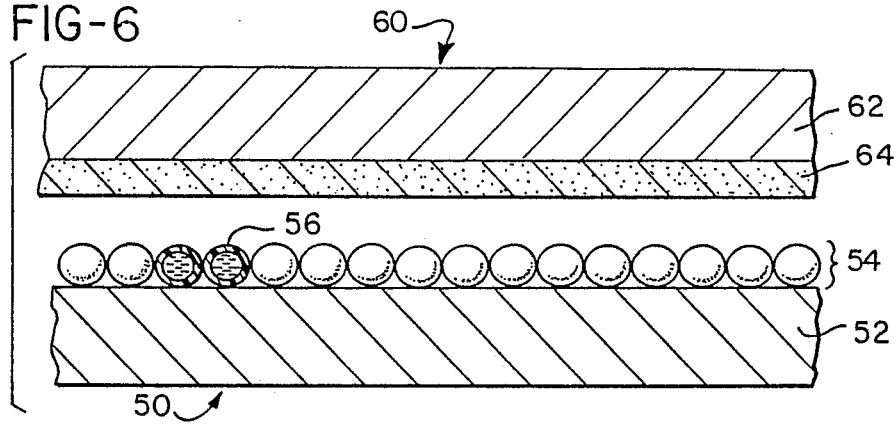
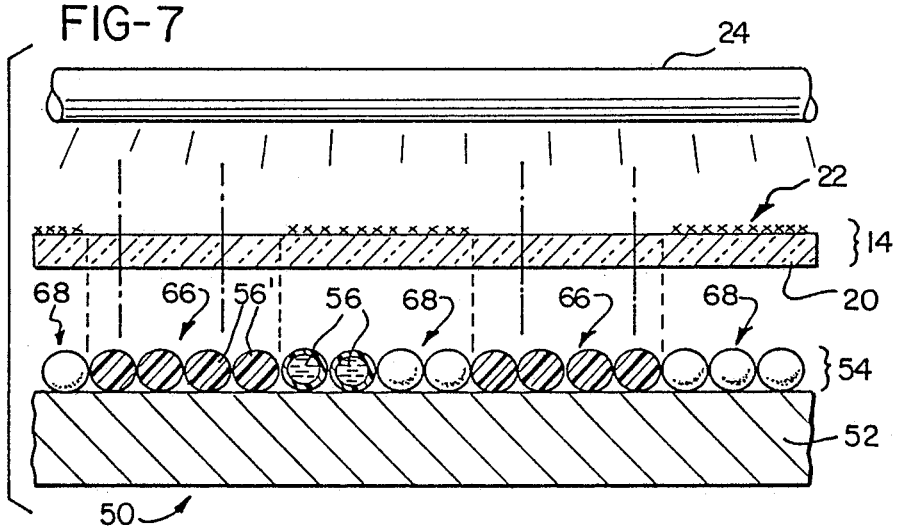
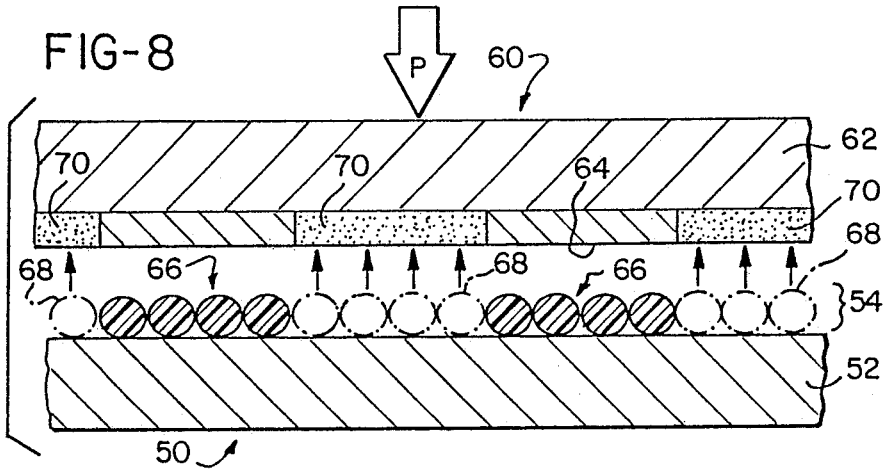

HIGH RESOLUTION FULL COLOR EXPOSURE DEVICE USING AN ELECTRONICALLY GENERATED MASK

BACKGROUND OF THE INVENTION

The present invention relates to a high resolution full color exposure device using masks electronically generated, i.e., from computer output, as color separations.

As those skilled in the art know, color separations are masks which are used in the exposure of photosensitive materials useful in generating a full color image. Each color separation whether blue, green, or red is generated individually. Blue, green, and red are the additive primary colors; their subtractive couples are yellow, magenta, and cyan respectively. Typically, photosensitive media produce full color images from combinations of the subtractive primaries-yellow, magenta, and cyan. In color separations, exposure of media through transparent areas of the blue separation exposes out (controls) yellow so that it does not develop in the image in exposed areas; similarly, the green separation controls magenta, and the red separation controls cyan. The separations are called "blue," "green," or "red" and not "yellow controlling," "magenta controlling," and "cyan controlling" due to a convention arising from two facts. First, control of yellow yields blue but only if there are no subsequent re-exposures for controlling magenta and/or cyan in these areas; similarly, control of magenta yields green and control of cyan yields red. Secondly, in a panchromatic system such as conventional photography, blue light controls yellow through the blue separation; green light controls magenta through the green separation; red light controls cyan through the red separation. Typically, after a set of separations is produced, a photosensitive material is exposed to a source of actinic radiation of the appropriate wavelength through each of the three separations such that the desired colors form upon subsequent development. Thus, after three exposures, subsequent development of the photosensitive material yields a full color image.

The blue, green, and red exposure wavelengths may be either matched to these colors as in a panchromatic system or may be any other set of three wavelengths such as ultraviolet or a combination of ultraviolet, visible, or even infrared. Except for laser light which is monochromatic (one wavelength), referral to wavelength also implies a bandpass. Bandpass is defined as the range of wavelengths centered on the given wavelength which are used in the exposure (i.e., for a wavelength of 580 nm and bandpass of 20 nm, the wavelengths included are 570 to 590 nm).

Proposals to use liquid crystal displays (LCD) or piezoelectric light transducers (PZLT) as electronically controlled light modulators for exposure of photosensitive material have several inherent problems. Both suffer from limited resolution capabilities and significant loss of light through the devices. Where exposure of the material is done by scanning one row of dots (pixels) or one dot at a time, dwell time of the light on the material can be on the order of thousandths or millionths of a second for reasonable image production times. It, therefore, becomes necessary to transmit very high intensities of light through the device onto the material. Due to the light loss previously mentioned, extremely high intensity light sources are necessary. Such light sources are expensive and produce significant amounts of heat.

Another problem with using high intensity light is high intensity reciprocity failure observed in both conventional photographic materials and the microencapsulated system described later in this document. High intensity reciprocity failure results in failure to control the dye in the exposed areas, appearing to be a reversal in extreme cases.

A method and apparatus for magnetic-optical printing employing a light-transparent uniformly magnetized magnetic medium is disclosed in U.S. Pat. No. 3,604,324. A magnetic substrate is uniformly magnetized and then image-wise demagnetized using a magnetic write-in means. The substrate is dusted with a magnetic toner which selectively attaches to the substrate to form a mask image through which a photographic material may be exposed.

Transparent photoconductors are commercially available. The photoconductors are first uniformly charged and then exposed to light to eliminate the charge in the exposed areas and form a latent image on the surface. Toner particles are then deposited in the charged areas.

A method for photoimaging a photosensitive layer is disclosed in U.S. Pat. No. 4,429,027. In a disclosed drum transfer technique, a drum transfer roll having a toner image on its surface transfers the toner on contact to a cover sheet which has been heated sufficiently to accept the toner. A photosensitive material is subsequently exposed through the applied toner on the cover sheet and the cover sheet is removed.

SUMMARY OF THE INVENTION

The present invention provides a method for forming color separations and exposing photosensitive material. Each color separation is electronically generated from computer output and immediately thereafter, a photosensitive material is exposed to a given wavelength through the color separation. In other words, the method involves electronically generating a blue color separation and exposing a photosensitive material to a first wavelength through the blue color separation; electronically generating a green color separation and exposing the same photosensitive material to a second wavelength through the green color separation; and electronically generating a red color separation and exposing the same photosensitive material to a third wavelength through the red color separation. Each color separation is electronically generated by electronically controlled printing means such as electrostatic heads or ink jet printers. Color separations are also generated by using transparent photoconductors.

In accordance with one embodiment of the present invention, electronically generating the color separations when using an electrostatic head comprises the steps of: placing static charges on a transparent substrate to form a latent image; and transferring opaque toner to the static charge latent image on the transparent substrate such that an opaque color separation is formed.

In accordance with another embodiment of the present invention, electronically generating the color separations comprises directing ink from an electronically controlled ink jet nozzle onto a transparent film on a transparent substrate to form a color separation.

In accordance with another embodiment of the present invention, the steps of electronically generating color separations are performed on a transparent photoconductor.

The present invention is particularly useful when forming full color images but is also applicable to monochrome images, e.g., black and white.

Masks which are formed by the method of the present invention allow for timely exposure of photosensitive materials from computer output. Furthermore, by generating masks in accordance with the present invention, less light loss occurs compared to other electronically controlled methods, and therefore, the masks of the present invention do not require the more expensive higher intensity light sources required by masks formed by systems such as LCD and PLZT. Additionally, better resolution capabilities are available through the use of the masks generated in the present invention.

The present method is advantageous because the mask generated can be used with exposure of any photosensitive material. For example, the photosensitive material of commonly assigned U.S. Pat. No. 4,399,209, conventional silver film, dry silver film, diazo film, and photolithography film can all be exposed through the masks generated in accordance with the present invention.

Thus, an object of the present invention is to provide a method for forming color separations wherein the color separations are electronically generated.

Another object of the present invention is to provide a method for electronically generating color separations and provide for timely exposure of any photosensitive material, provide for less light loss, and provide better resolution capabilities than other electronically controlled means such as LCD or PZLT.

An additional object of the present invention is to provide a method for forming color separations wherein the color separations generated can be temporary or permanent.

Other objects and advantages of the present invention will become apparent from the following description, attached drawings, and appended claims.

Definitions

The term "electronically generated" means that the color separation is generated by electronically controlled printing means of the type previously mentioned.

BRIEF DESCRIPTION OF THE DRAWINGS

FIG. 6 is a schematic illustration of an imaging sheet and a developer sheet useful in the present invention.

FIG. 7 is a schematic illustration of exposure of the imaging sheet of FIG. 6.

FIG. 8 is a schematic illustration of transfer development.

DETAILED DESCRIPTION OF THE INVENTION

Figure 1:
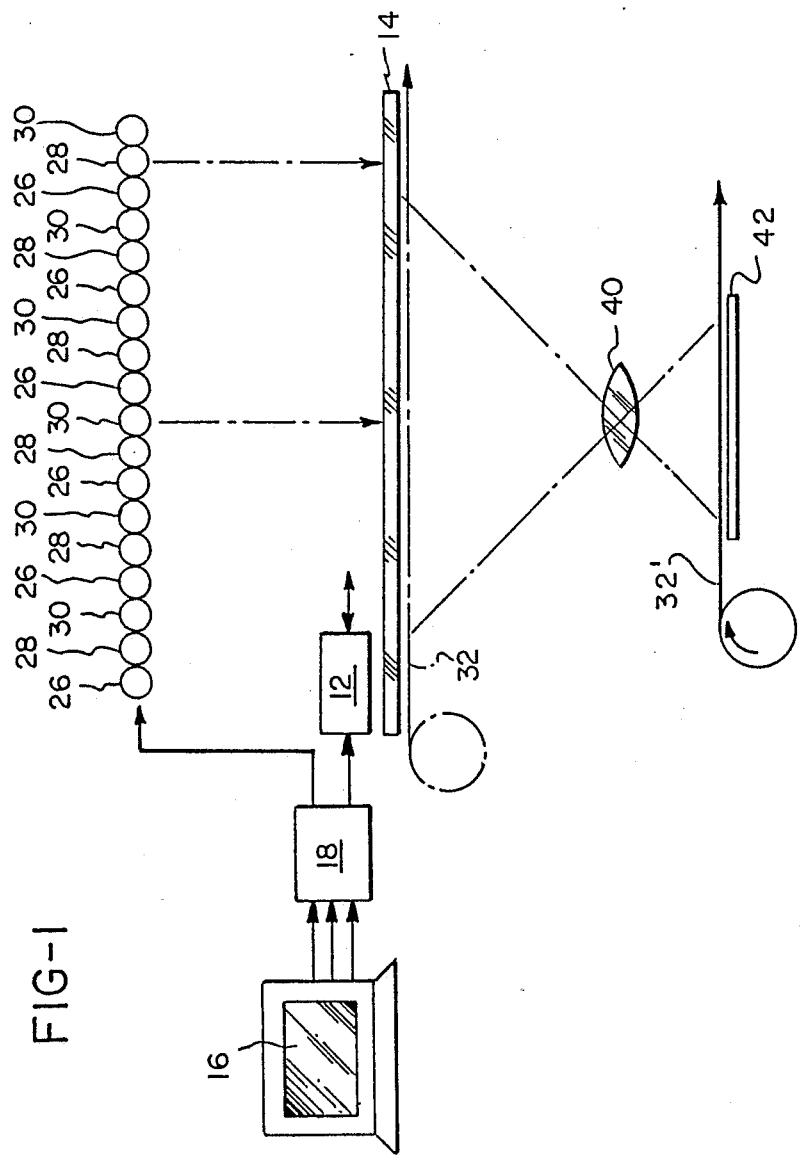
FIG. 1 is a schematic illustration of an apparatus useful in electronically generating color separations by an electrostatic head with associated exposure hardware.
Figure 2:
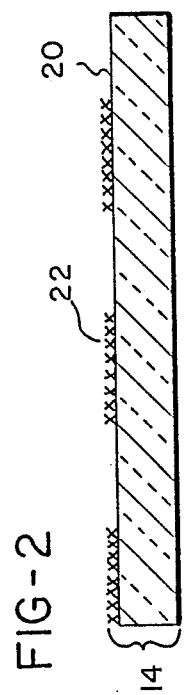
FIG. 2 is a schematic illustration of a color separation generated by an electrostatic head.

In accordance with one embodiment of the present invention, an electrostatic head 12 as shown in FIG. 1 is used to electronically generate a color separation 14. Useful electrostatic heads 12 for placing the static charges are commercially available. Useful electrostatic heads which can be modified to deposit and recover toner are also commercially available. One manufacturer of electrostatic heads is Versatec, Inc. A computer 16 generates the three color image and sends RGB (red, green, blue) color signals to a frame store 18 which separately stores each color signal. The frame store 18 transmits the single color digital image information to the electrostatic head 12 and transmits switching information to the bank of lights 24. To create the color separation 14 as shown in FIG. 2, the electrostatic head 12 places static charges on a transparent substrate 20 to form a latent image and transfers toner 22 to the static charges on the transparent substrate 20 such that a color separation is formed corresponding to the original color image.

The transparent substrate 20 can be glass or plastic and may or may not be specially treated or coated. The transparent substrate 20 can also be covered with a flexible transparent film such as a polyester film. Herein the term "toner" refers to any opaque pigment which blocks light of the wavelength used and can be electrostatically deposited. Examples of useful toner materials are disclosed in U.S. Pat. Nos. 3,959,153; 4,251,616; and 4,520,091.

After electronic generation of a color separation 14, the bank of lights 24 which consists of lights having three different wavelengths of radiation as indicated by 26, 28, and 30 responds to the switching information received from the frame store 18. For example, if the photosensitive material 32 is a panchromatic system which is visible light sensitive and a blue separation has been created, the three different wavelengths of radiation correspond to blue, green, and red light and the blue light is triggered. If the photosensitive material 32 is ultraviolet sensitive and a blue separation has been created, the three different wavelengths of radiation correspond to ultraviolet radiation and an appropriate wavelength for blue is triggered. The bank of lights 24 can also consist of lights with appropriate filters for wavelength separation. When the appropriate light has been triggered, the photosensitive material 32 is exposed through the color separation 14 and the subtractive couple is controlled so it does not develop in the final image in the exposed areas. A shuttering system optionally may be used.

After electronic generation of each color separation and exposure of a photosensitive material through the color separation, the electrostatic head 12 optionally erases the image from the transparent substrate 20, and thus, the transparent substrate 20 can be reused in the electronic generation of the next color separation 14. If the image has been formed on a transparent film on the transparent substrate 20, the film with the image thereon can be removed after exposure and replaced with another transparent film to be used with transparent substrate 20 in the electronic generation of other color separations. After the steps of electronically generating color separations and exposing the photosensitive material through the color separations have been completed, the photosensitive material is developed to form a full color image.

To briefly summarize the use of the apparatus of FIG. 1 in electronically generating blue, green, and red separations, the computer 16 generates the three color image and send RGB (red, green, blue) color signals to frame store 18 which separately stores each color signal. The frame store 18 then transmits a first single color digital image, e.g., blue, to the electrostatic head 12 and switching information to the bank of lights 24. The electrostatic head 12 places static charges on the transparent substrate 20 to form a blue color separation latent image of the original image; and transfers opaque toner 22 to the static charges on the transparent substrate 20 such that a blue color separation of the original image is formed. Assuming that the photosensitive material 32 is visible light sensitive and panchromatic, a blue set of lights, e.g., 26, exposes the photosensitive material 32 through the blue separation. The electrostatic head 12 then erases the transparent substrate 20.

The frame store 18 then transmits a second single color digital image, e.g., green, to the electrostatic head 12 and transmits the switching information to the bank of lights 24. The electrostatic head 12 then places static charges on the transparent substrate 20 to form a green color separation latent image of the original image; and transfers opaque toner 22 to the static charges on the transparent substrate 20 such that a green color separation of the original color image is formed. A green set of lights, e.g., 28, exposes the photosensitive material 32 through the green separation. The electrostatic head 12 then erases the transparent substrate 20.

The frame store 18 then sends a third single color digital image, e.g., red, to the electrostatic head 12 and transmits switching information to the bank of lights 24. The electrostatic head 12 places static charges on the transparent substrate 20 to form a red color separation latent image of the original image; and transfers opaque toner 22 to the static charges on the transparent substrate 20 such that a red color separation of the original image is formed. A red set of lights, e.g., 30, exposes the photosensitive material 32 through the red separation. The electrostatic head 12 then erases the transparent substrate 20 for future use.

In this way, after development, a full color image is formed. It should be understood that the three color separations must register. When the photosensitive material is not sensitive to visible light, the banks of lights 26, 28, and 30 are designed to emit radiation in three distinct bands, i.e., $\lambda-1$, $\lambda-2$, and $\lambda-3$.

Figure 3:
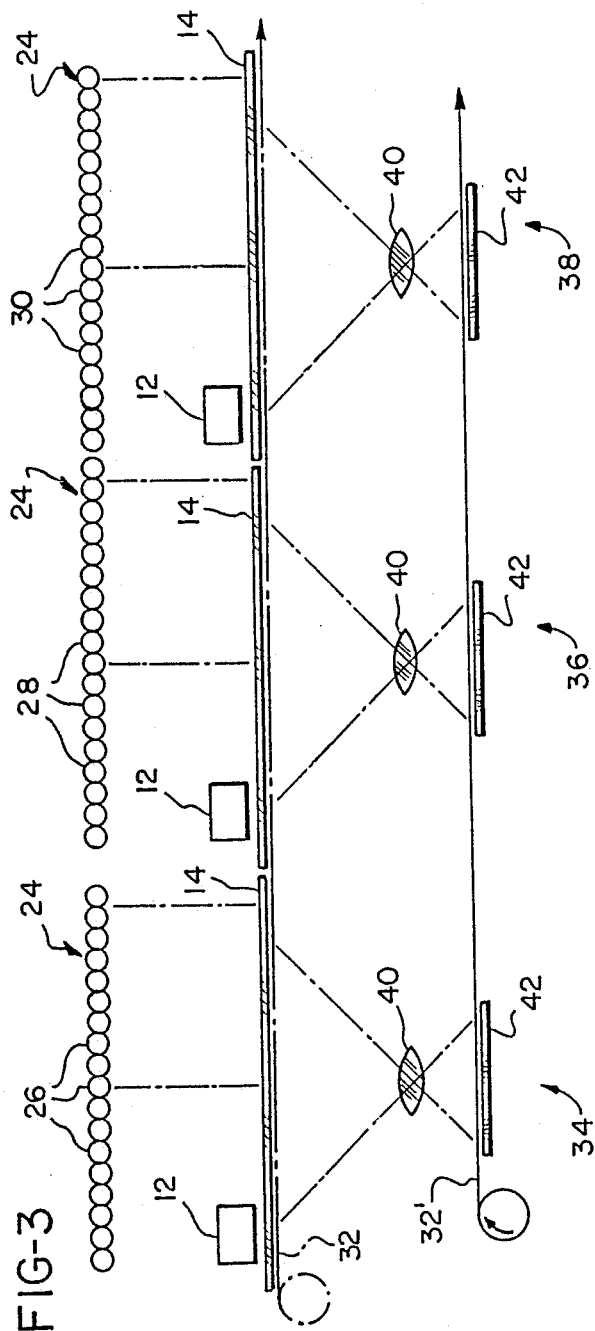
FIG. 3 is a schematic illustration of another apparatus useful in electronically generating color separations by an electrostatic head with associated exposure hardware.

In addition to the apparatus of FIG. 1 wherein three exposures occur at one color separation generation and exposure station, an apparatus having three separate color separation generation and exposure stations can be used as shown in FIG. 3. Although the computer 16 and frame store 18 of FIG. 1 are not illustrated in FIG. 3, they are used in direct analogy to FIG. 1 except the computer can also control the advance of the photosensitive material through the exposure stations.

To briefly summarize the use of the apparatus of FIG. 3 in electronically generating blue, green, and red separations, after receiving a first single color digital image, e.g., blue, the electrostatic head 12 at exposure station 34 places static charges on the transparent substrate 20 to form a blue color separation latent image of the original image and transfers opaque toner 22 to the static charges on the transparent substrate 20 such that a blue color separation of the original image is formed. Assuming that the photosensitive material 32 is visible light sensitive, blue light 26 exposes the photosensitive material 32 through the blue separation. The photosensitive material 32 is then moved to exposure station 36.

After receiving a second single color digital image, e.g., green, the electrostatic head 12 places static charges on the transparent substrate 20 to form a green color separation latent image from the original image; and transfers opaque toner 22 to the static charges on the transparent substrate 20 such that a green color separation of the original image is formed. Green light 28 then exposes the photosensitive material 32 through the green separation. The photosensitive material 32 is then moved to exposure station 38.

After receipt of a third color digital image, e.g., red, the electrostatic head 12 places static charges on the transparent substrate 20 to form a red color separation latent image of the original red image; and transfers opaque toner 22 to the static charges on the transparent substrate 20 such that an opaque red color separation of the original image is formed. Red light 30 then exposes the photosensitive material 32 through the red separation. In this way, upon subsequent development, a full color image is formed. A few of the many advantages of the apparatus of FIG. 3 are that high throughput and high quality or resolution are achieved. Once the set of three color separations is generated, numerous repeated exposures of a continuous web or sheets of photosensitive material can be done. This is especially desirable when many copies of one color image are desired. Commercial low volume color printing is one application.

Exposure of the photosensitive material 32 through the mask may be by contact or projection. The exposure apparatus may be designed to accommodate either or both exposure systems. For contact printing, the photosensitive material 32 is conveyed directly beneath the color separation 14. Contact printing is desirable because it uses the light source most efficiently and because lens systems 40 which uniformly direct light from the separation to the photosensitive material at 32′ tend to be expensive.

For projection imaging, e.g., enlarged, one to one, or reduced images, a lens system schematically illustrated by 40 is interposed between the color separation 14 and the photosensitive material 32′ such that the photosensitive material 32′ is exposed through the lens system 40 and the color separation 14 to the bank of lights 24. Reduction yields the best resolution and concentrates the light such that its effective intensity per unit area is greater than a one to one projection. Reduction allows for high resolution images from lower resolution masking materials. Although not illustrated, embodiments are possible in which the image is enlarged.

The apparatuses of FIGS. 1 and 3 are useful in generating single or multiple copies in reduced, one-to-one or enlarged formats. It is also possible to equip the apparatus with means to produce a color slide by using three exposures through the three color separations, and developing and mounting the slide film by conventional means.

Figure 5:
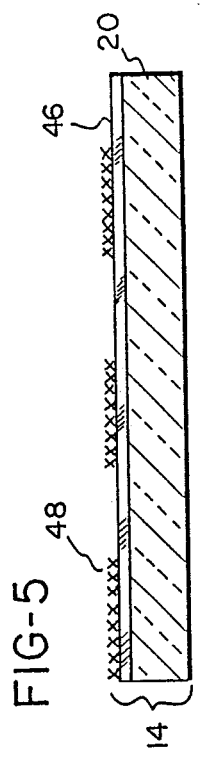
FIG. 5 is a schematic illustration of a color separation generated by an ink jet printer.
Figure 4:
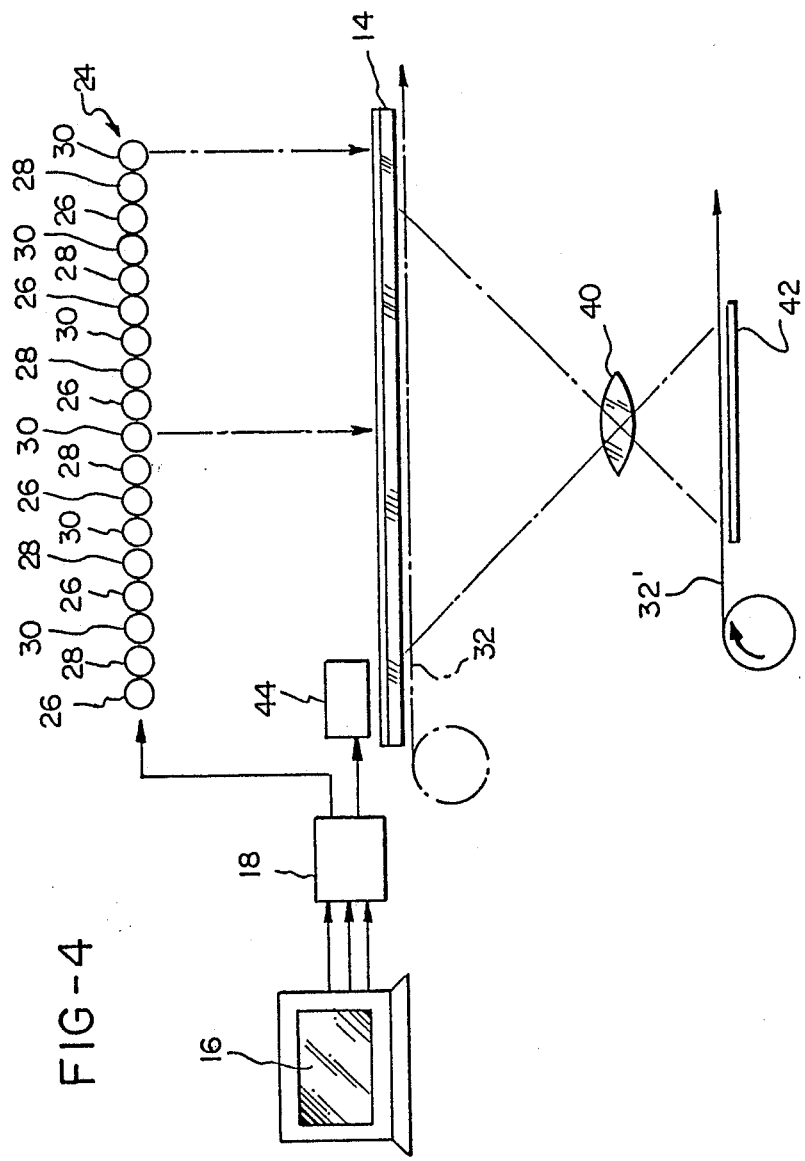
FIG. 4 is a schematic illustration of an apparatus useful in electronically generating color separations by an ink jet printer with associated exposure hardware.

In accordance with another embodiment of the present invention, an ink jet printer 44 as shown in FIG. 4 is used to electronically generate the color separation 14. The ink jet printer 44 directs ink 48 onto a transparent film 46 on a transparent substrate 20 as shown in FIG. 5. Useful inks and ink jet printers are commercially available. The color separations electronically generated by the ink jet printer are permanent whereas the color separations electronically generated by the electrostatic head can be permanent or temporary. Transparent substrate 20 can be glass or plastic and may or may not be specially treated or coated. Unlike the optional use of a transparent film with the electrostatic head, a transparent film 46 is used with ink jet printer 44 because of the permanence of the ink 48. Except for the foregoing the apparatus of FIG. 4 is similar to the apparatus of FIG. 1 and is used in an analogous manner. This embodiment can also be used in an apparatus similar to that shown in FIG. 3.

As mentioned previously, the present invention is useful in electronically generating temporary or permanent color separations. The term "temporary" as used herein means a readily erasable or removable image. The term "permanent" as used herein means an image which is not easily erasable or removable.

The electrostatic head 12 places static charges on the transparent substrate 20 and transfers toner 22 thereto to create the color separation 14 as shown in FIG. 2. Because the toner 22 does not become firmly anchored to the transparent substrate 20, a temporary color separation 14 is created. In other words, after exposure through the color separation 14, the toner 22 can readily be removed from the transparent substrate 20 and the substrate 20 can be reused in the electronic generation of other color separations. Alternatively, a permanent mask can be formed as shown in FIG. 5. In this case, substrate 20 is overlaid with a transparent film 46. Film 46 can be provided to the surface of substrate 20 as individual sheets or it can be continuously paid out from a stock roll. A permanent toner (e.g., a heat fusible toner) or ink from an ink jet is printed on the film 46 as described above. After exposure, the mask can be stored as a permanent record.

Another possible embodiment may use a transparent photoconductor such as the organic photoconductors available from Fuji Photo Film Co., Ltd., in its Fujix cassette filing systems. Photoconductors are first uniformly charged and then exposure to light eliminates the charge in the exposed areas forming a latent image on the surface. The photoconductor can also be selectively charged to form a latent image. Toner particles are then deposited in the charged areas. Photosensitive media may be exposed through this mask. The mask may be erased as in the electrostatic application. Exposure of the photoconductor to form a latent image in this device as a color separation may be done using a computer controlled head similar to the electrostatic or ink jet application. This head would carry a light source and/or fiber optic light guides to expose the photoconductor. In a process analogous to the other two embodiments, three color separations could be formed and photosensitive material exposed to form full color images upon development. Other means which may be used include either transmission or reflection from an original instead of from computer output. This direct exposure from a color original through three color separation filters yields three color separations which can be used as outlined above. The high resolution, processing ease, and low cost of the organic photoconductor make it an ideal candidate for use in the present invention.

To briefly summarize the method for forming color separations when using a transparent photoconductor, a blue color separation is generated by forming a latent electrostatic image on a transparent photoconductor and transferring opaque toner to the latent electrostatic image. The latent electrostatic image can be formed by uniformly placing static charges on the transparent photoconductor and selectively eliminating charges or by selectively placing static charges on the transparent photoconductor. A photosensitive material is then exposed to a first wavelength through the blue color separation. A green color separation is generated by forming a latent electrostatic image on a transparent photoconductor and transferring opaque toner to the latent electrostatic image. The same photosensitive material is then exposed to a second wavelength through the green color separation. A red color separation is generated by forming a latent electrostatic image on a transparent photoconductor and transferring opaque toner to the latent electrostatic image. The same photosensitive material is then exposed to a third wavelength through the red color separation. The photosensitive material is then developed to form a full color image.

As mentioned earlier, the present method is advantageous in exposing any photosensitive material. The full color photosensitive materials of commonly assigned U.S. Ser. No. 339,917, filed Jan. 18, 1982 and U.S. Pat. No. 4,576,891 are particularly useful in the method of the present invention. Useful carrier oils, radiation sources, encapsulation techniques, and developer materials are described in U.S. Pat. No. 4,399,209 which is hereby incorporated by reference. Preferred developer materials are described in U.S. patent application Ser. No. 905,727, filed Sept. 9, 1986. Preferred photosensitive compositions are disclosed in U.S. Ser. No. 917,873 filed Oct. 10, 1986.

FIG. 6 illustrates one embodiment of such a full color imaging system. Therein an imaging sheet 50 is shown comprising a substrate 52 with a layer of microcapsules 54. The microcapsules 54 are filled with an internal phase 56 and individually contain cyan, magenta, and yellow color formers and photosensitive compositions having distinctly different sensitivities. In actuality, the microcapsules 54 are not visible to the unaided eye. Associated with the imaging sheet 50 is a developer sheet 60 comprising a substrate 62 which can be opaque or transparent and a layer 64 of a developer material. Again, in actuality, the developer material 64 is not seen by the unaided eye as a separate layer.

As shown in FIG. 7, a first exposure of the microcapsules 54 through a color separation 14 such as blue to blue light causes the radiation curable material of the blue sensitive microcapsules of the exposed areas 66 in the internal phase 56 to polymerize, thereby gelling, solidifying or otherwise immobilizing the yellow color former. Although not illustrated, the internal phases of the green and red sensitive microcapsules of the exposed areas remain liquid upon exposure to blue light. Internal phase 56' in the blue sensitive microcapsules of the exposed areas 66 is shown as a solid while the internal phase 56 remains liquid in the unexposed areas 68 which may be used later with the exposures through the green and red separations. It should be noted that substrate 52 can be opaque or transparent. Although not illustrated, imaging sheet 50 is then exposed to green and red light through the green and red color separations.

When exposing a photosensitive material through three color separations, each exposure is at a distinct wavelength. The wavelengths can be in the visible region, ultraviolet region, infrared region, or combinations thereof. Preferably, ultraviolet or visible light is used.

As shown in FIG. 8, after three exposures, the microcapsules 54 are ruptured for image development. The now exposed imaging sheet 50 is placed with its microcapsule layer 54 in face to face contact with a developer material 64 of developer sheet 60 and pressure P is uniformly applied across the sheets.

Typically, the microcapsules 54 are ruptured by passing the imaging sheet 50 and the developer sheet 60 together through a nip between two pressure rollers. A useful pressure development apparatus is disclosed in commonly assigned U.S. Ser. No. 009,581, filed Feb. 2, 1987. Other useful means for rupturing the microcapsules 54 are disclosed in commonly assigned U.S. Pat. Nos. 4,448,516; 4,533,615; 4,578,340; 4,592,986; and U.S. Ser. No. 010,922, filed Feb. 5, 1987. The pressure causes the internal phase 56 from the non-solidified areas such as 68 to transfer to the developer sheet 60 as shown schematically by the arrows in FIG. 8. Upon transfer of the internal phase 56 to the developer sheet 60, the cyan, magenta, and yellow color formers react with developer layer 64 to form a full color image 70 on the developer sheet 60.

The present invention is also useful in creating a permanent full color mask. In accordance with this embodiment of the present invention, a photosensitive material is exposed to each of the three color separations. The photosensitive material is then developed against a transparent developer sheet to produce a full color transparency. This permanent full color transparency or mask can be stored and later exposed to white light in a single exposure to create a full color image. In a similar fashion, monochromatic transparencies can be obtained. These can be used as color separations.

While the present invention is illustrated using a transfer system, those skilled in the art will appreciate that the present invention can also be used in conjunction with the self-contained imaging systems described in commonly assigned U.S. Pat. No. 4,440,846. Furthermore, while the invention is illustrated for photohardenable microcapsules, photosoftenable microcapsules may also be used.

Having described the invention in detail and by reference to preferred embodiments thereof, it will be apparent that modifications and variations are possible without departing from the scope of the invention defined in the appended claims.

What is claimed is:

1. A method for exposing an imaging sheet through a color separation comprising the steps of:
   electronically generating a blue color separation and exposing an imaging sheet to a first wavelength of radiation through said blue color separation, said imaging sheet comprising a substrate and a layer of microcapsules on one surface thereof, said microcapsules having an internal phase of color former and a photohardenable photosensitive composition;
   electronically generating a green color separation and exposing said imaging sheet to a second wavelength of radiation through said green color separation;
   electronically generating a red color separation and exposing said imaging sheet to a third wavelength of radiation through said red color separation; and
   subjecting said imaging sheet to a uniform rupturing force in the presence of a developer.

2. The method of claim 1 wherein said steps of electronically generating said color separations comprise the steps of:
   placing static charges on a transparent substrate; and
   transferring opaque toner to said static charges.

3. The method of claim 2 wherein an electrostatic head is used to place said static charges on said transparent substrate.

4. The method of claim 1 wherein said steps of electronically generating said color separations comprise directing ink droplets from an ink jet nozzle onto a transparent substrate.

5. The method of claim 1 wherein said steps of electronically generating said color separations are performed on a transparent photoconductor.

6. The method of claim 1 wherein said first wavelength, said second wavelength, and said third wavelength are distinct wavelengths.

7. The method of claim 1 wherein said first wavelength, said second wavelength, and said third wavelength are wavelengths in the visible region, ultraviolet region, infrared region, or a mixture thereof.

8. The method of claim 2 wherein after each exposure step, said opaque toner is removed from said transparent substrate.

9. A method comprising the steps of:
   forming a blue color separation latent electrostatic image on a transparent photoconductor;
   transferring opaque toner to said latent electrostatic image to form a blue color separation;
   exposing a photosensitive material to a first wavelength of radiation through said blue color separation;
   forming a green color separation latent electrostatic image on a transparent photoconductor;
   transferring opaque toner to said latent electrostatic image to form a green color separation;
   exposing said photosensitive material to a second wavelength of radiation through said green color separation;
   forming a red color separation latent electrostatic image on a transparent photoconductor;
   transferring opaque toner to said latent electrostatic image to form a red color separation; and
   exposing said photosensitive material to a third wavelength of radiation through said red color separation; said photosensitive material comprising a support having a layer of microcapsules on the surface, said microcapsules containing an image-forming agent and a photohardenable composition.

10. The method of claim 9 wherein said steps of forming said latent electrostatic images comprise the steps of:
    uniformly placing static charges on said transparent photoconductor; and
    selectively eliminating charges to form said latent electrostatic images.

11. The method of claim 9 wherein said steps of forming said latent electrostatic images comprise the step of selectively placing static charges on said transparent photoconductor to form said latent electrostatic images.

12. The method of claim 9 wherein after each exposure step, said opaque toner is removed from said transparent photoconductor.

* * * * *